United States Patent
Lingras et al.

(10) Patent No.: US 12,541,746 B2
(45) Date of Patent: Feb. 3, 2026

(54) METHOD OF RECYCLING INTEGRATED CIRCUITS

(71) Applicant: PHINIA Jersey Holdings LLC, Wilmington, DE (US)

(72) Inventors: Sushant Lingras, Troy, MI (US); Alan Mattiazzo, Troy, MI (US); David Pierce, Troy, MI (US); Yeshwant Bhoskar, Troy, MI (US)

(73) Assignee: PHINIA Jersey Holdings LLC, Wilmington, DE (US)

( * ) Notice: Subject to any disclaimer, the term of this patent is extended or adjusted under 35 U.S.C. 154(b) by 212 days.

(21) Appl. No.: 18/437,584

(22) Filed: Feb. 9, 2024

(65) Prior Publication Data

US 2025/0259151 A1    Aug. 14, 2025

(51) Int. Cl.
G06Q 10/30 (2023.01)
G06F 11/26 (2006.01)
G06T 7/00 (2017.01)

(52) U.S. Cl.
CPC ............ *G06Q 10/30* (2013.01); *G06F 11/26* (2013.01); *G06T 7/0004* (2013.01); *G06T 2207/30141* (2013.01)

(58) Field of Classification Search
CPC .......... G06Q 10/30; G06T 2207/30141; H05K 13/0486; H05K 3/225; H05K 2203/176
See application file for complete search history.

(56) References Cited

U.S. PATENT DOCUMENTS 4,270,260 A * 6/1981 Krueger ................. H01L 24/75
257/E21.511

FOREIGN PATENT DOCUMENTS

| CN | 1520944 A | 8/2004 |
| CN | 101502903 A | 8/2009 |
| CN | 102891097 A | 1/2013 |
| WO | 2017103902 A1 | 6/2017 |

OTHER PUBLICATIONS

International Search Report of the International Searching Authority for Application No. PCT/US2025/014450, mailed May 13, 2025 (2 pages).

* cited by examiner

*Primary Examiner* — Thanh Luu
(74) *Attorney, Agent, or Firm* — WARNER NORCROSS + JUDD LLP

(57) ABSTRACT

A method of recycling an integrated circuit (IC) from a printed circuit board (PCB) is provided and includes identifying a target device on a used printed circuit board. The used board is subjected to a screening process including visually inspection and meeting certain criteria. The used printed circuit board is discarded if it is rejected by the screening process. The method further includes preconditioning the used printed circuit board at a temperature greater than 100° C. for a period of time of at least 48 hours, and desoldering the target device from the printed circuit board to isolate the target device. The isolated target device is subjected to visual inspection and functional testing. The isolated target device is then heat treated at a temperature greater than 100° C. for a period of time of at least 12 hours, and subsequently stored in an electrostatic-discharge-protected environment in presence of nitrogen gas.

14 Claims, 3 Drawing Sheets

METHOD OF RECYCLING INTEGRATED CIRCUITS

FIELD OF THE INVENTION

The disclosure generally relates to recycling of electrical components, and more particularly to recycling of integrated circuits from printed circuit boards.

BACKGROUND OF THE INVENTION

Printed circuit boards (PCBs) have become commonplace and are presently used in most if not all electronic products and systems. One such use is in the electronic systems of automotive vehicles. PCBs include a number of electrical components, one being integrated circuits (ICs) that are soldered onto outer layers of PCBs. ICs are designed to perform specific functions directed to the end use of the PCBs into which they are incorporated. Thus, a production issue may arise if a specific IC for a specific PCB becomes unavailable in a newly manufactured, unused state, as the specific IC is critical to the function of the PCB. Further, with the proliferation of electronic devices in modern society, there is a growing amount of waste electronics including used PCBs and their accompanying ICs. Therefore, a need exists for methods of recycling electronic components to alleviate waste and to promote environmental and economic sustainability.

BRIEF SUMMARY

A method of recycling an integrated circuit (IC) from a printed circuit board (PCB) is provided. The method includes providing a used printed circuit board having a desired configuration. The method further includes identifying a target device on the used printed circuit board, and rejecting the used printed circuit board if the target device is not present and therefore cannot be identified. The method further includes subjecting the used printed circuit board with the identified target device to a screening sub-process. The screening sub-process includes visually inspecting the used printed circuit board for physical damage, wherein the used printed circuit board is rejected if the printed circuit board has physical damage that exceeds a board-physical-damage threshold; visually inspecting the target device for physical damage, wherein the used printed circuit board is rejected if the target device has physical damage that exceeds a device-physical-damage threshold; and obtaining data associated with the used printed circuit board and comparing the data to board-data criteria, wherein the used printed circuit board is rejected if the obtained data does not meet the board-data criteria. The used printed circuit board is discarded if the used printed circuit board is rejected by the screening sub-process, and the used printed circuit board is kept if the used printed circuit board is not rejected by the screening sub-process. The method further includes preconditioning the used printed circuit board by baking in an oven at a temperature greater than 100° C. for a period of time of at least 48 hours. The method further includes desoldering the target device from the printed circuit board to isolate the target device. The method further includes visually inspecting the isolated target device. The isolated target device is rejected if the isolated target device does not pass the visual inspection. The method further includes performing a functional test of the isolated target device. The isolated target device is rejected if the isolated target device does not pass the functional test. On the other hand, if the isolated target device passes the functional test, the isolated target device is designated as an acceptable target device. The method further includes baking the acceptable target device at a temperature greater than 100° C. for a period of time of at least 12 hours, and subsequently storing the acceptable target device in an electrostatic-discharge-protected environment in presence of nitrogen gas.

In specific embodiments, the target device is an integrated circuit chip.

In specific embodiments, the board-physical-damage threshold includes presence of one or more of a burn mark and fire damage.

In specific embodiments, the device-physical-damage threshold includes presence of one or more of a bent connector pin, a broken connector pin, and non-parallel connector pins.

In specific embodiments, the board-data criteria includes one or more of: (i) less than 7,000 hours of service time for the used printed circuit board; (ii) the target device was not used in a previous printed circuit board; (iii) maximum board operating temperature less than or equal to 115° C.; and (iv) average board operating temperature less than or equal to 105° C.

In specific embodiments, the temperature in the step of preconditioning is approximately 125° C.

In specific embodiments, the visual inspection of the isolated target device includes at least one of: (i) checking the isolated target device for excess solder; (ii) validating connector pins of the isolated target device are parallel; (iii) validating the connector pins are free of unwanted bends; (iv) checking the isolated target device for contamination; and (v) validating the encapsulation of the isolated target device does not extend beyond tops of the connector pins.

In specific embodiments, the functional test is performed using a dedicated test station.

In specific embodiments, the target device is a motor predriver IC.

In specific embodiments, the used printed circuit board is a smart remote actuator obtained from a motor vehicle.

In specific embodiments, the step of providing a used printed circuit board having a desired configuration includes providing a plurality of used printed circuit boards having the same desired configuration.

In specific embodiments, the method further includes removing the stored, acceptable target device from storage, and using the acceptable target device for construction of a new printed circuit board having the same configuration as the used printed circuit board.

In particular embodiments, the step of using the acceptable target device for construction of the new printed circuit board includes: placing the acceptable target device on a printed circuit board; soldering the acceptable target device to the printed circuit board; visually inspecting the soldering of the acceptable target device to the printed circuit board; and performing a functional test of the printed circuit board.

A printed circuit board including an integrated circuit obtained by the method is also provided. The obtained printed circuit board has the same configuration as the used printed circuit board.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A method of recycling a target device such as an integrated circuit (IC) from a used component such as a used printed circuit board (PCB) is provided. Also provided is a new printed circuit board fabricated using an integrated circuit obtained by the recycling method. The method allows for fabrication of new circuit boards without the need to directly procure new component devices that may be in short supply or completely unavailable. The method also reduces the environmental and economic impact of waste electronic components by providing for the harvesting and reuse of used electronic components.

Figure 1:
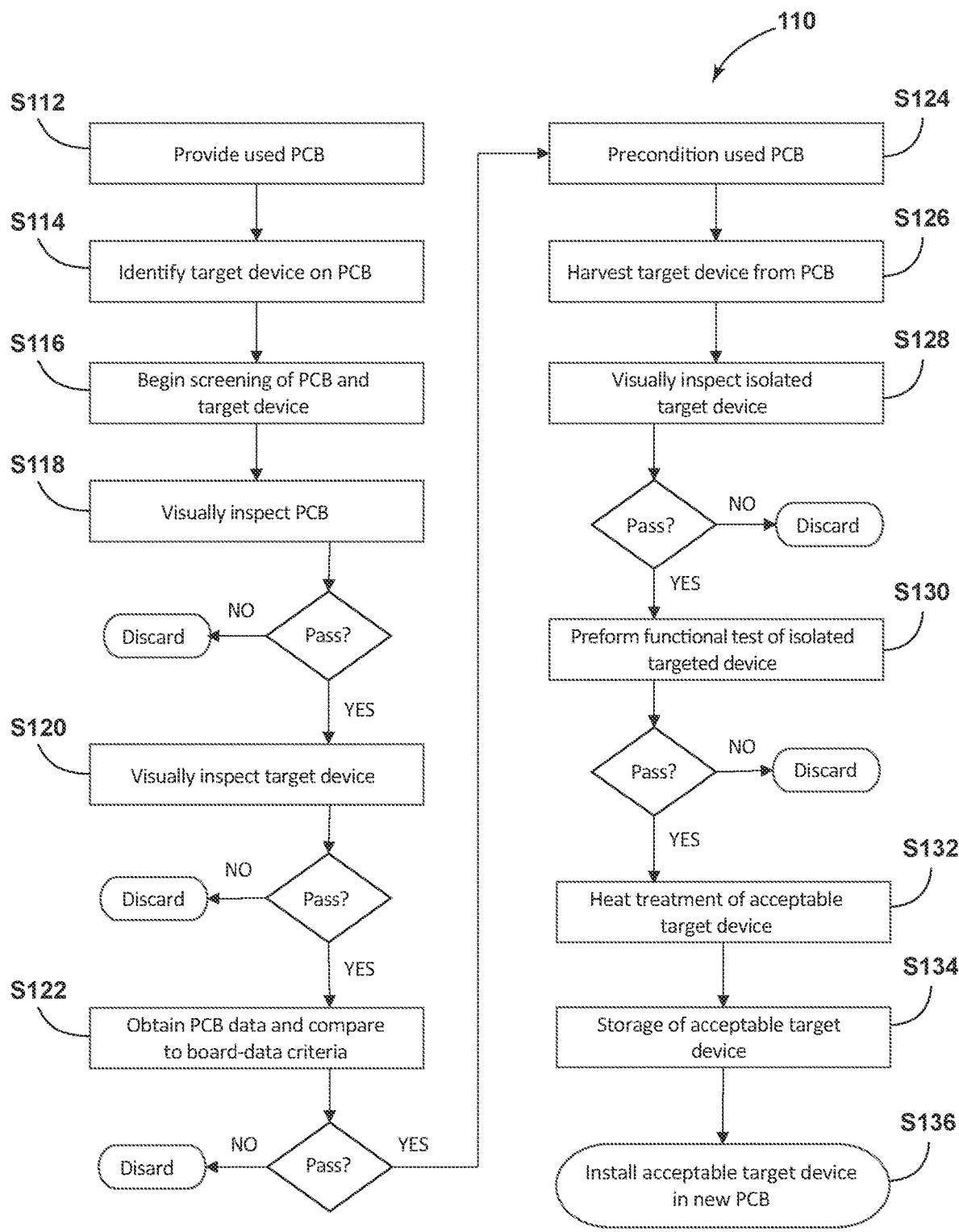
FIG. 1 is a flowchart of a method of recycling an integrated circuit from a printed circuit board in accordance with embodiments of the disclosure.
Figure 2:
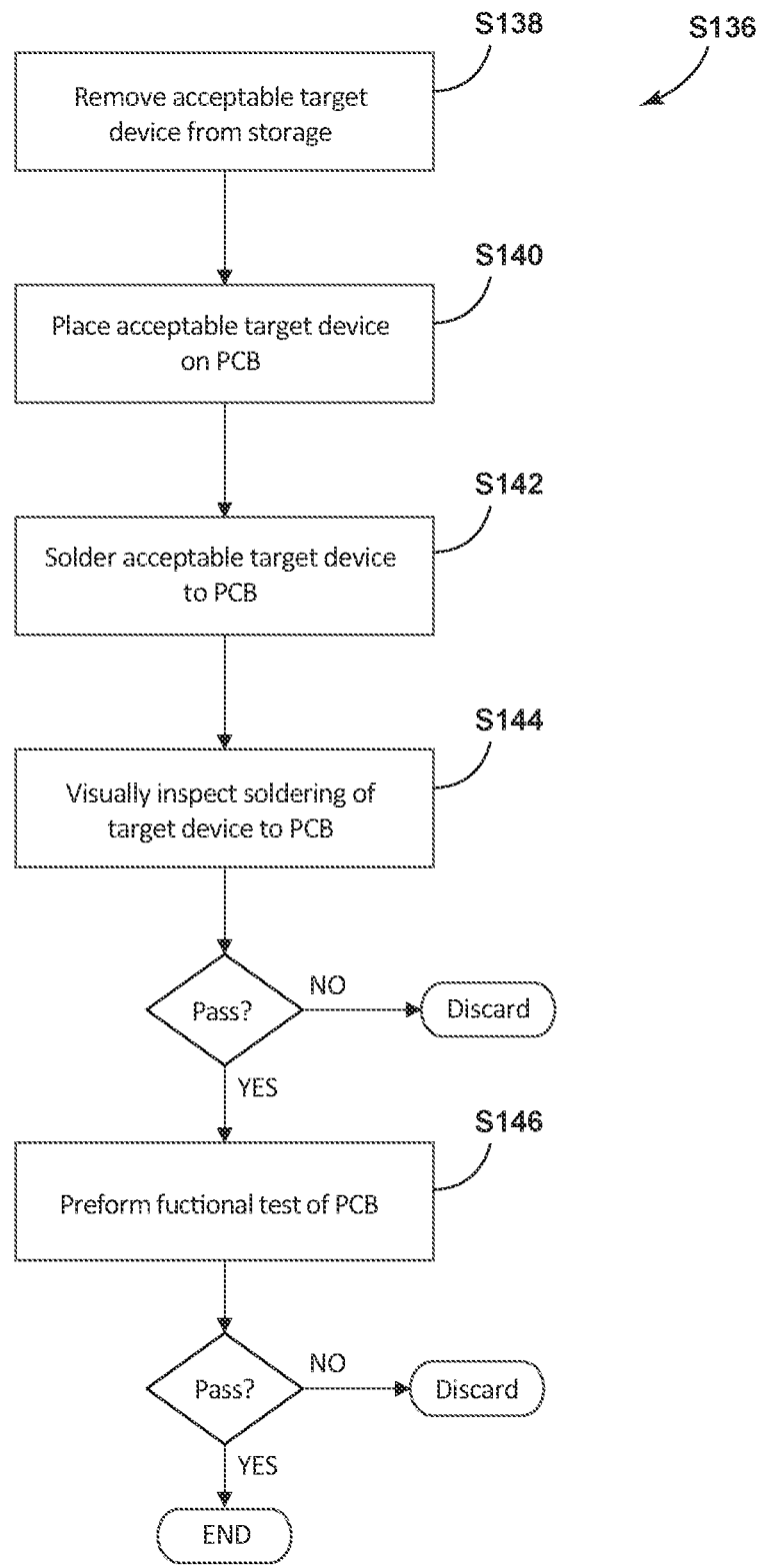
FIG. 2 is a flowchart of sub-steps of a step of using the recycled integrated circuit to fabricate a new printed circuit board in accordance with embodiments of the method.
Figure 3:
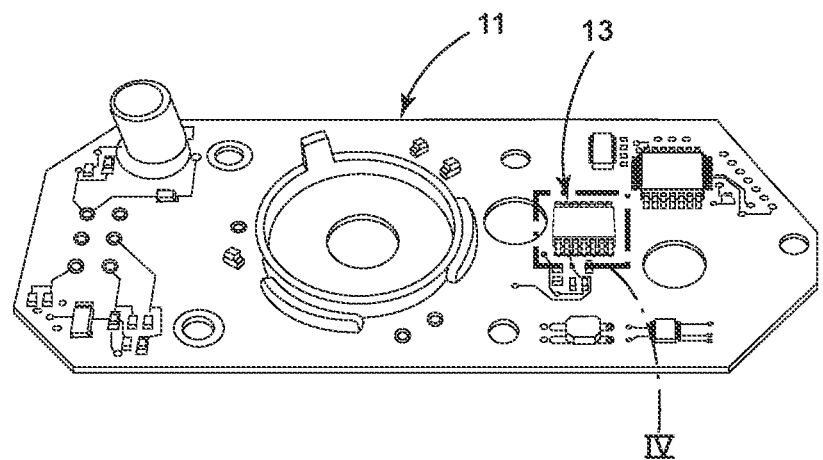
FIG. 3 is a schematic view of a printed circuit board including a target integrated circuit in accordance with embodiments of the disclosure.

With reference to FIGS. 1 and 2, the method 110 first includes at step S112 providing at least one used printed circuit board having a desired configuration, and preferably a plurality of used printed circuit boards such as five, ten, multiples of ten, one hundred, or multiples of hundred used printed circuit boards. A "used" printed circuit board is a pre-existing printed circuit board that has been distributed into the field and put into its intended use, thereby having a service time of greater than 0 hours and having less than 100% of its service life remaining. Typically, a used printed circuit board may have accumulated 100's or 1000's of service hours of use. One exemplary printed circuit board 11 is shown in FIG. 3. The printed circuit board 11 has a specific arrangement of devices and sub-components. The specific arrangement of devices and subcomponents of the printed circuit board define the configuration of the board. In a certain embodiment, the printed circuit board 11 is a smart remote actuator for an automotive vehicle. In this embodiment, such a smart remote actuator is the desired configuration, and as such the smart remote actuator is the printed circuit board that is provided. Further, the used printed circuit board(s) may be provided by obtaining PCBs such as smart remote actuators from automotive vehicles in the field and/or that are no longer in service. The plurality of PCBs obtained should therefore all have the same desired configuration.

One of the devices on the used printed circuit board 11 is a target device 13 disposed at a specific location on the board. By "target" it is meant that the device is the one that is sought after for recycling. The target device may be, for example, an integrated circuit (IC), also known as a chip, a microchip, or a microelectronic circuit. In a certain embodiment, the target device 13 is a motor predriver IC of the smart remote actuator. However, the target device could be any other desired integrated circuit or other chip or subcomponent of the printed circuit board.

The method 110 next includes identifying the target device 13 on the subject used printed circuit board 11 at step S114. The printed circuit board 11 is thus visually or optically scanned to locate the target device 13 on the board 11. If the target device such as a specific integrated circuit is not present on the printed circuit board and as such cannot be identified, this particular printed circuit board is rejected and subsequently discarded, and the method returns to the previous step S112 by providing/obtaining another used printed circuit board or picking another used printed circuit board from a group of already obtained printed circuit boards.

Figure 4:
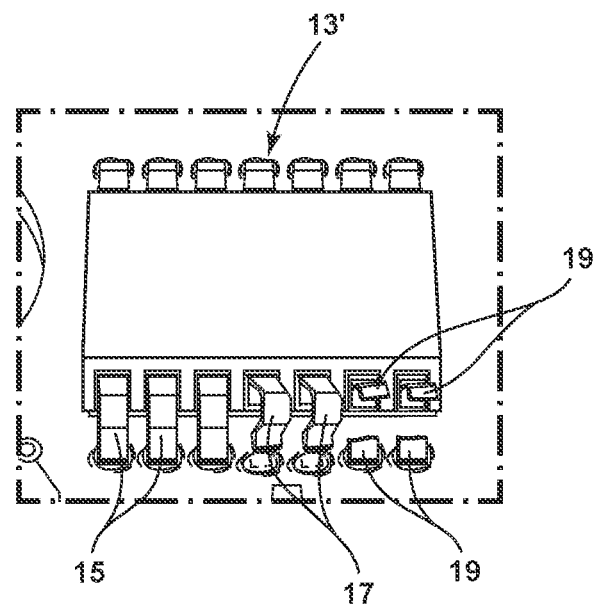
FIG. 4 is a schematic view of a target integrated circuit having physical damage.

Once the target device 13 is identified on the printed circuit board 11, the printed circuit board is subjected to a screening process beginning at step S116 in order to generally weed out and eliminate printed circuit boards that are excessively worn or critically damaged. The screening process includes, in no particular order: (i) visually inspecting the used printed circuit board for physical damage at step S118; (ii) visually inspecting the target device for physical damage at step S120; and (iii) obtaining data associated with the used printed circuit board and comparing the data to board-data criteria at step S122. Visually inspecting the used printed circuit board at step S118 may include inspecting the board for the presence of burn marks or other fire damage, which generally can indicate that some or all of the electrical components of the board may be damaged. If any burn marks or fire damage are present, the physical condition of the used printed circuit board is deemed to exceed a board-physical-damage threshold. Such a used printed circuit board does not pass the visual inspection, is rejected and subsequently discarded, and the method returns to the step S112 of providing/obtaining another used printed circuit board or picking another used printed circuit board from a group of already obtained printed circuit boards. Visually inspecting the target device at step S120 may include inspecting the condition of the plurality of connector pins that extend from the target device and which provide electrical connection of the target device with the printed circuit board. Damage to the connector pins includes one or more bent connector pins, two or more non-parallel connector pins, and/or one or more broken connector pins. By way of example, a target device 13' including damaged connector pins is shown in FIG. 4. Acceptable connector pins 15 are parallel to each other, parallel and in line with their respective connectors on the printed circuit board, and not bent from this desired configuration. Bent and non-parallel connector pins 17 are not parallel with the acceptable connector pins 15, are not in line with their respective connectors on the printed circuit board, and are bent from their desired configuration. Bent and broken connector pins 19 are completely askew from their desired configuration, broken from their attachment to the target device, or in some cases missing entirely. Connector pin damage impairs the ability of the target device to form a proper electrical connection with the printed circuit board and is hence undesirable. If any or all of a bent connector pin, a broken connector pin, or non-parallel connector pins are present, the physical condition of the target device on the used printed circuit board is deemed to exceed a device-physical-damage threshold. A printed circuit board including such a target device does not pass the visual inspection, is rejected and subsequently discarded, and the method returns to the step S112 of providing/obtaining another used printed circuit board or picking another used printed circuit board from a group of already obtained printed circuit boards. On the other hand, a printed circuit board 11 having a visually undamaged target device 13 (FIG. 3) is deemed to pass the visual inspection. Obtaining data associated with the used printed circuit board at step S122 includes reading data from the core of the used printed circuit board, such as but not limited to the time-in-service of the used printed circuit board, the maximum operating temperature experienced by the used printed circuit board, the average run time temperature experienced by the used printed circuit board, and whether or not the target device of the used printed circuit board has been recycled once already. The data obtained from the used printed circuit board is then compared with board-data criteria. For example, the board-data criteria may include that the time-in-service of the used printed circuit board is less than 7,000 hours, the maximum operating temperature of the used printed circuit board is less than or equal to 115° C., the average operating temperature of the used printed circuit board is less than or equal to 105° C., and the target device has not been recycled before, i.e. the target device should have been used in only one (the present) printed circuit board. If the data obtained from the used printed circuit board does not meet the board-data criteria, for example the target device has already been recycled once before and/or the used printed circuit board has been in service for more than 7,000 hours, the used printed circuit board does not pass, is rejected and subsequently discarded, and the method returns to the step S112 of providing/obtaining another used printed circuit board or picking another used printed circuit board from a group of already obtained printed circuit boards.

A used printed circuit board that is not rejected by the screening process, i.e. a used printed circuit board that passes the screening process, is kept and the method proceeds to the next step, which is a preconditioning step at S124. Particularly, the used printed circuit board is preconditioned by a heat treatment (baking) process. The baking process includes placing the used printed circuit board face up (with the target device being visible and facing upwards) on a tray, and putting the tray in an oven for a period of time at a temperature greater than 100° C., optionally greater than 105° C., optionally greater than 110° C., optionally greater than 115° C., optionally greater than 120° C., optionally greater than 125° C., or approximately 125° C. (i.e., 125° C.±5° C.). The period of time may be at least 12 hours, optionally at least 24 hours, optionally at least 36, and preferably at least a minimum of 48 hours.

The preconditioned used printed circuit board may be temporarily kept in storage after the baking step, but either immediately or after a period of time in storage, the preconditioned used printed circuit board is advanced to the next step S126 which is removal of the target device from the board. The removal specifically includes unsoldering/desoldering of the target device from the board. Prior to the desoldering, the target device on the board may be cleaned. The desoldering of the connector pins of the target device from the used printed circuit board may be performed by any suitable means, for example using desoldering equipment such as a Hakko FR811. Desoldering of the connector pins separates the target device from the board and thereby the target device can be removed from the board and isolated. The isolated target device is then subjected to a second screening process that may include a visual inspection of the target device at step S128 and/or functional testing of the target device at step S130. The visual inspection at step S128 may include one or more of: (i) checking the isolated target device for excess solder on or around the connector pins; (ii) validating the connector pins of the isolated target device are in a parallel arrangement with each other; (iii) validating the connector pins are free of unwanted bends or breaks; (iv) checking the isolated target device for the presence of contamination; and (v) validating the encapsulation of the isolated target device does not extend beyond tops of the connector pins, i.e. the encapsulation does not extend beyond where the connector pins extend from the body of the target device. If the isolated target device does not pass (i.e., fails any aspect of the visual inspection), the isolated target device is rejected and subsequently discarded, and the method returns to the step S112 of providing/obtaining another used printed circuit board or picking another used printed circuit board from a group of already obtained printed circuit boards. Functional testing of the isolated target device at step S130 may be performed using a dedicated test station, and generally verifies whether or not the isolated target device is capable of performing its intended electrical functions. If the isolated target device does not pass the functional test, the isolated target device is rejected and subsequently discarded, and the method returns to the step S112 of providing/obtaining another used printed circuit board or picking another used printed circuit board from a group of already obtained printed circuit boards.

Alternatively, one or both of the visual inspection of the isolated target device or the functional testing of the isolated target device may not be performed. If the isolated target device passes the performed testing (i.e., either or both of the visual inspection and functional test, whichever is/are performed), the isolated target device is designated as an acceptable target device. Such an acceptable target device is suitable for installation and use in a new printed circuit board.

Throughout the above-described process, the used printed circuit board and target device should be maintained in a static free and electrostatic-discharge-protected environment to avoid damage to the target device by electrostatic discharge. Further, after an acceptable target device is obtained by the process above, the acceptable target device may be subjected to an additional heat treatment at step S132 in an oven for a period of time at a temperature greater than 100° C., optionally greater than 105° C., optionally greater than 110° C., optionally greater than 115° C., optionally greater than 120° C., optionally greater than 125° C., or approximately 125° C. (i.e., 125° C.±5° C.). The period of time may be at least 3 hours, optionally at least 6 hours, optionally at least 9, and preferably at least a minimum of 12 hours. Subsequently, if the acceptable target device will not be immediately used in a new printed circuit board, at step S134 the acceptable target device is stored in an electrostatic-discharge-protected environment such as but not limited to an electrostatic discharge (ESD) bag in the presence of nitrogen gas, to protect the acceptable target device from damage that can be caused by static discharge.

Subsequent to obtaining the acceptable target device and/or placing the acceptable target device in storage, the method may further include using the acceptable target device for construction of a new printed circuit board having the same configuration as the used printed circuit board at step S136. For example, if the used printed circuit board was a smart remote actuator, the acceptable target device obtained from the used printed circuit board is removed from storage (if the device is in storage) at sub-step S138 and installed in a new printed circuit board that is a smart remote actuator of the same configuration as the used printed circuit board. The construction of a new printed circuit board includes placing the acceptable target device on the new printed circuit board at sub-step S140 and soldering the acceptable target device on the new printed circuit board at sub-step S142. Subsequently, the soldering of the acceptable target device may by visually inspected for quality at sub-step S144, and a functional test may be performed on the new printed circuit board at sub-step S146 to verify proper functioning of the acceptable target device in the new printed circuit board. If the new printed circuit board fails either the visual inspection of the functional test, the new printed circuit board is rejected and discarded. Otherwise, the new printed circuit board is deemed acceptable for use, and the method is finished.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A method of recycling an integrated circuit (IC) from a printed circuit board (PCB), the method comprising:
   providing a used printed circuit board having a desired configuration;
   identifying a target device on the used printed circuit board, and rejecting the used printed circuit board if the target device is not present and therefore cannot be identified;
   subjecting the used printed circuit board with the identified target device to a screening sub-process that includes:
      visually inspecting the used printed circuit board for physical damage, wherein the used printed circuit board is rejected if the printed circuit board has physical damage that exceeds a board-physical-damage threshold;
      visually inspecting the target device for physical damage, wherein the used printed circuit board is rejected if the target device has physical damage that exceeds a device-physical-damage threshold; and
      obtaining data associated with the used printed circuit board and comparing the data to board-data criteria, wherein the used printed circuit board is rejected if the obtained data does not meet the board-data criteria;
   discarding the used printed circuit board if the used printed circuit board is rejected by the screening sub-process, and keeping the used printed circuit board if the used printed circuit board is not rejected by the screening sub-process;
   preconditioning the used printed circuit board by baking in an oven at a temperature greater than 100° C. for a period of time of at least 48 hours;
   desoldering the target device from the printed circuit board to isolate the target device;
   visually inspecting the isolated target device, wherein the isolated target device is rejected if the isolated target device does not pass the visual inspection;
   performing a functional test of the isolated target device, wherein the isolated target device is rejected if the isolated target device does not pass the functional test, and if the isolated target device passes the functional test, the isolated target device is designated as an acceptable target device; and
   baking the acceptable target device at a temperature greater than 100° C. for a period of time of at least 12 hours, and subsequently storing the acceptable target device in an electrostatic-discharge-protected environment in presence of nitrogen gas.

2. The method of claim 1, wherein the target device is an integrated circuit chip.

3. The method of claim 1, wherein the board-physical-damage threshold includes presence of one or more of a burn mark and fire damage.

4. The method of claim 1, wherein the device-physical-damage threshold includes presence of one or more of a bent connector pin, a broken connector pin, and non-parallel connector pins.

5. The method of claim 1, wherein the board-data criteria includes one or more of: (i) less than 7,000 hours of service time for the used printed circuit board; (ii) the target device was not used in a previous printed circuit board; (iii) maximum board operating temperature less than or equal to 115° C.; and (iv) average board operating temperature less than or equal to 105° C.

6. The method of claim 1, wherein the temperature in the step of preconditioning is approximately 125° C.

7. The method of claim 1, wherein the visual inspection of the isolated target device includes at least one of: (i) checking the isolated target device for excess solder; (ii) validating connector pins of the isolated target device are parallel; (iii) validating the connector pins are free of unwanted bends; (iv) checking the isolated target device for contamination; and (v) validating the encapsulation of the isolated target device does not extend beyond tops of the connector pins.

8. The method of claim 1, wherein the functional test is performed using a dedicated test station.

9. The method of claim 1, wherein the target device is a motor predriver IC.

10. The method of claim 1, wherein the used printed circuit board is a smart remote actuator obtained from a motor vehicle.

11. The method of claim 1, wherein the step of providing a used printed circuit board having a desired configuration includes providing a plurality of used printed circuit boards having the same desired configuration.

12. The method of claim 1, further comprising:
removing the stored, acceptable target device from storage;
using the acceptable target device for construction of a new printed circuit board having the same configuration as the used printed circuit board.

13. The method of claim 12, wherein using the acceptable target device for construction of the new printed circuit board comprises:
placing the acceptable target device on a printed circuit board;
soldering the acceptable target device to the printed circuit board;
visually inspecting the soldering of the acceptable target device to the printed circuit board; and
performing a functional test of the printed circuit board.

14. A printed circuit board obtained by the method of claim 12, wherein the obtained printed circuit board has the same configuration as the used printed circuit board.

* * * * *